United States Patent
Ishihara

(10) Patent No.: US 9,367,746 B2
(45) Date of Patent: Jun. 14, 2016

(54) IMAGE PROCESSING APPARATUS FOR SPECIFYING AN IMAGE RELATING TO A PREDETERMINED MOMENT FROM AMONG A PLURALITY OF IMAGES

(71) Applicant: CASIO COMPUTER CO., LTD., Shibuya-ku, Tokyo (JP)

(72) Inventor: Masanori Ishihara, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/500,513

(22) Filed: Sep. 29, 2014

(65) Prior Publication Data

US 2015/0092995 A1 Apr. 2, 2015

(30) Foreign Application Priority Data

Sep. 30, 2013 (JP) ................................ 2013-203332

(51) Int. Cl.
G06K 9/00 (2006.01)

(52) U.S. Cl.
CPC ........ *G06K 9/00724* (2013.01); *G06K 9/00342* (2013.01)

(58) Field of Classification Search
CPC ........... G06K 9/00724; A63B 24/0006; G06T 2207/10004; G06T 2207/20148; G06T 2207/30224; G06T 7/2006; G06T 7/2033; H04N 5/23267

See application file for complete search history.

(56) References Cited

U.S. PATENT DOCUMENTS

| | | | |
|---|---|---|---|
| 6,417,853 B1* | 7/2002 | Squires et al. | ................. 345/473 |
| 8,894,500 B2 | 11/2014 | Ueda et al. | |
| 2004/0246123 A1 | 12/2004 | Kawabe et al. | |
| 2005/0196017 A1* | 9/2005 | Altherr et al. | ................. 382/103 |
| 2009/0153730 A1* | 6/2009 | Knee et al. | ..................... 348/445 |
| 2009/0225174 A1* | 9/2009 | Handa et al. | ............... 348/208.3 |
| 2009/0231453 A1* | 9/2009 | Huang | ....................... 348/220.1 |

(Continued)

FOREIGN PATENT DOCUMENTS

| | | |
|---|---|---|
| JP | 2005160017 A | 6/2005 |
| JP | 2011030669 A | 2/2011 |

(Continued)

OTHER PUBLICATIONS

Korean Office Action (and English translation thereof) dated Aug. 31, 2015, issued in counterpart Korean Application No. 10-2014-0126242.

(Continued)

*Primary Examiner* — Jingge Wu
(74) *Attorney, Agent, or Firm* — Holtz, Holtz & Volek PC

(57) ABSTRACT

An image capture apparatus includes an image acquisition unit $5a$, an area setting unit $5b$, and an image specifying unit $5c$. The image acquisition unit $5a$ acquires a first image group including plural images, the plural images obtained by sequentially photographing motion of an object. The area setting unit $5b$ sets plural areas at plural positions on each of the images of the first image group acquired by the image acquisition unit $5a$. The image specifying unit $5c$ acquires pixel values of the plural areas set on each of the images by the area setting unit, and specifies a second image group including plural images relating to prescribed moments of motion of the object from among the first image group including plural images, based on change in the acquired pixel values of the plural areas.

7 Claims, 6 Drawing Sheets

(56) References Cited

U.S. PATENT DOCUMENTS

| | | | |
|---|---|---|---|
| 2010/0097401 A1* | 4/2010 | Shiratani | 345/660 |
| 2010/0321505 A1* | 12/2010 | Kokubun | 348/170 |
| 2011/0268194 A1* | 11/2011 | Nagano | 375/240.25 |
| 2011/0293239 A1* | 12/2011 | Tomidokoro | 386/230 |
| 2012/0106869 A1* | 5/2012 | Machitani et al. | 382/284 |
| 2014/0211997 A1* | 7/2014 | Kokubun | 382/103 |
| 2014/0321722 A1* | 10/2014 | Tsuda et al. | 382/118 |

FOREIGN PATENT DOCUMENTS

| | | |
|---|---|---|
| JP | 2013101419 A | 5/2013 |
| JP | 2013138742 A | 7/2013 |
| KR | 1020010016275 A | 3/2001 |
| KR | 1020040105612 A | 12/2004 |

OTHER PUBLICATIONS

Japanese Office Action (and English translation thereof) dated Sep. 8, 2015, issued in counterpart Japanese Application No. 2013-203332.

Japanese Office Action (and English translation thereof) dated Jan. 12, 2016, issued in counterpart Japanese Application No. 2013-203332.

* cited by examiner

IMAGE PROCESSING APPARATUS FOR SPECIFYING AN IMAGE RELATING TO A PREDETERMINED MOMENT FROM AMONG A PLURALITY OF IMAGES

CROSS-REFERENCE TO RELATED APPLICATION

This application is based upon and claims the benefit of priority under 35 USC 119 of Japanese Patent Application No. 2013-203332 filed on Sep. 30, 2013, the entire disclosure of which is hereby incorporated by reference in its entirety for all purposes.

BACKGROUND OF THE INVENTION

1. Field of the Invention

The present invention relates to an image processing apparatus, an image processing method, and a storage medium, which specify an image relating a predetermined moment from among a plurality of images.

2. Description of the Related Art

Japanese Unexamined Patent Publication No. 2011-30669 discloses a technology which specifies an image of a golf player at the moment when he/she hits a golf ball from a moving image of the golf player who performs a series of golf swing. More specifically, the technology or the apparatus uses Doppler sensor to detect a position of the golf ball hit by the golf player, thereby calculating a speed of the ball, and specifies an image at the impact moment from a moving image previously recorded in a ring buffer based on a processing time required for calculating the speed of the golf ball.

SUMMARY OF THE INVENTION

According to one aspect of the invention, there is provided an image processing apparatus which comprises an acquisition unit which acquires a first image group including plural images, the plural images obtained by sequentially photographing motion of an object; an area setting unit which sets plural areas at plural positions on each of the images of the first image group acquired by the acquisition unit; and a specifying unit which acquires pixel values of the plural areas set on each of the images by the area setting unit, and specifies a second image group including plural images relating to prescribed moments of motion of the object from among the first image group including plural images, based on change in the acquired pixel values of the plural areas.

According to another aspect of the invention, there is provided a method of specifying images in an image processing apparatus, which method comprises an acquisition step of acquiring a first image group including plural images, the plural images obtained by sequentially photographing motion of an object; an area setting step of setting plural areas at plural positions on each of the images of the first image group acquired at the acquisition step; and a specifying step of acquires pixel values of the plural areas set on each of the images at the area setting step, and specifying a second image group including plural images relating to prescribed moments of motion of the object from among the first image group including plural images, based on change in the acquired pixel values of the plural areas.

According to other aspect of the invention, there is provided a non-transitory computer-readable storage medium with an executable program stored thereon, wherein the program instructs a computer to perform the following steps: an acquisition step of acquiring a first image group including plural images, the plural images obtained by sequentially photographing motion of an object; an area setting step of setting plural areas at plural positions on each of the images of the first image group acquired at the acquisition step; and a specifying step of acquiring pixel values of the plural areas set on each of the images at the area setting step, and specifying a second image group including plural images relating to prescribed moments of motion of the object from among the first image group including plural images, based on change in the acquired pixel values of the plural areas.

DETAILED DESCRIPTION OF THE PREFERRED EMBODIMENTS

Hereinafter, the preferred embodiments of the present invention will be explained with reference to the accompanying drawings in detail. The scope of the invention will not be limited to the illustrated embodiments.

Figure 1:
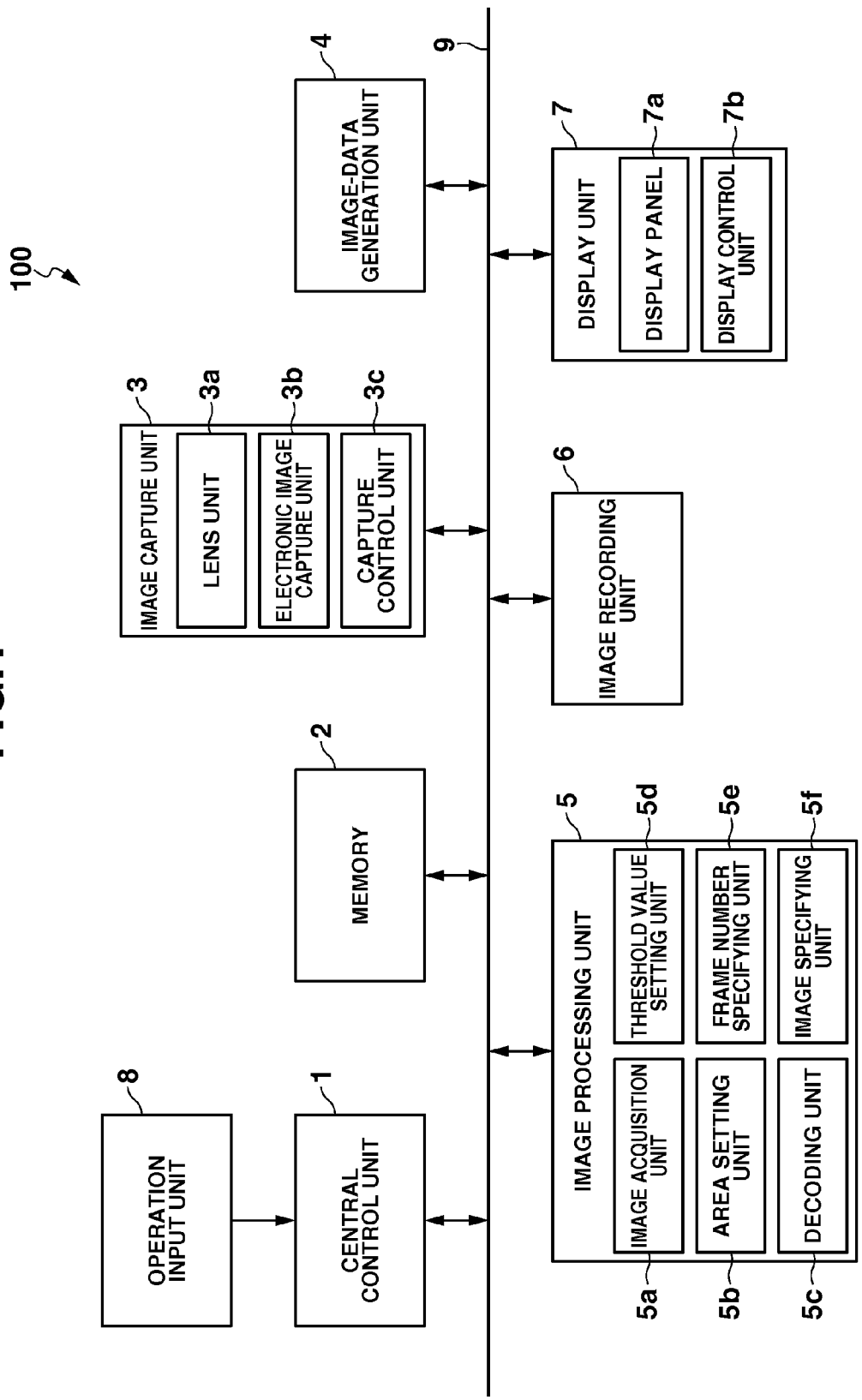
FIG. 1 is a block diagram showing a hardware configuration of an image capture apparatus according to an embodiment of the present invention.

FIG. 1 is a block diagram schematically showing a configuration of an image capture apparatus 100 according to the embodiment of the present invention.

As shown in FIG. 1, the image capture apparatus 100 according to the embodiment comprises a central control unit 1, a memory 2, an image capture unit 3, an image-data generation unit 4, an image processing unit 5, an image recording unit 7, and an operation input unit 8.

The central control unit 1, the memory 2, the image capture unit 3, the image-data generation unit 4, the image processing unit 5, the image recording unit 6, the display unit 7, and the operation input unit 8 are connected to each other via a bus line 9.

The central control unit 1 controls the whole operation of the image capture apparatus 100. More specifically, the central control unit 1 controls units of the image capture apparatus 100. More specifically, the central control unit 1 includes a CPU (Central Processing Unit), a RAM (Random Access Memory) and a ROM (Read Only Memory) (all not shown). The central control unit 1 performs various control operations in accordance with various process programs (not shown) for the image capture apparatus 100.

The memory 2 consists of, for example, a DRAM (Dynamic Random Access Memory) or the like and temporarily stores therein, for example, data to be processed by the central control unit 1, the image processing unit 5 and the like.

Figure 4:
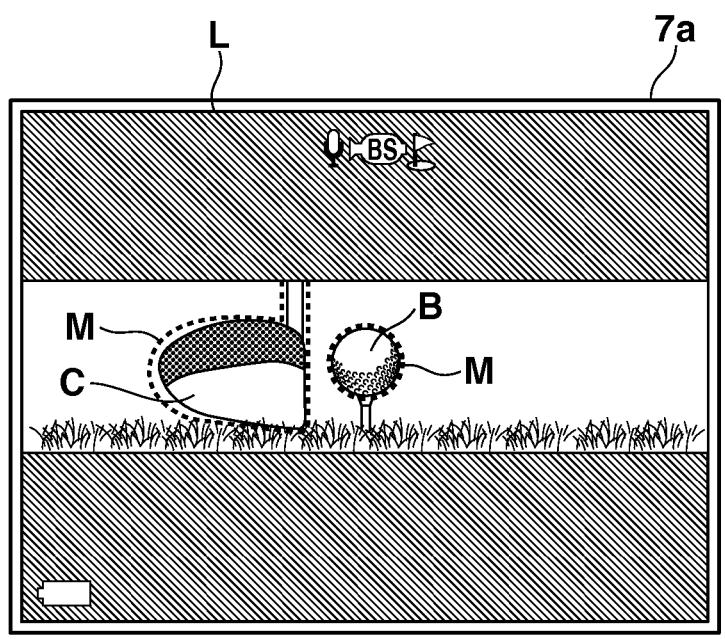
FIG. 4 is a view schematically showing an example of a live-view image data according to the image processing of FIG. 2.

The image capture unit 3 captures an image of an object (e.g. a head C of a golf club as shown in FIG. 4) which exists in a background. The image capture unit 3 includes a lens unit 3a, an electronic image capture unit 3b, and a capture control unit 3c.

The lens unit 3a is constituted of, for example, multiple lenses, such as a zoom lens and a focus lens.

The electronic image capture unit 3b is constituted of, for example, an image sensor, such as a CMOS (Complementary Metal-Oxide Semiconductor), or a CCD (Charge Coupled Device), and converts an optical image passing through the various lenses of the lens unit 3a into a two-dimensional signal.

The image capture unit 3 can include a diaphragm (not shown) which adjusts the amount of light passing through the lens unit 3a.

The image capture control unit 3c controls an image capture operation of the image capture unit 3 to capture an image of the object. That is, the image capture control unit 3c includes a timing generator and a driver (both not shown). The driver of the image capture control unit 3c drives the electronic image capture unit 3b in accordance with operation of the timing generator, thereby making the electronic image capture unit 3b convert an optical image into a two-dimensional signal at each predetermined period. Then, the image capture control unit 3c repeatedly reads frame image data F for one screen from an image capture region of the electronic image capture unit 3b, and outputs the frame image data to the image-data generation unit 4.

Receiving the frame image data F from the electronic image capture unit 3b, the image-data generation unit 4 performs a gain adjustment on RGB analog color components contained in the received data, then transfers the RGB analog color components to a sample-and-hold circuit (not shown) for sampling-and-holding, and converts the RGB analog color components to digital data in an A/D converter (not shown). Further, the image-data generation unit 4 performs a color signal process including a pixel interpolation process and a gamma-correction process on the digital data in a color processing circuit (nor shown), thereby generating a luminance signal (digital signal) Y and color difference signals Cb, Cr (YUV data). The signals Y, Cb and Cr are digital signals. The image-data generation unit 4 encodes each of plural pieces of frame image data composing moving image data in a predetermined compression format such as MPEG format and Motion JPEG format to generate moving image data.

The image-data generation unit 4 transmits the generated moving image data to the memory 2 which is used as a buffer memory.

The image processing unit 5 includes an image acquisition unit 5a, an area setting unit 5b, a decoding unit 5c, a threshold value setting unit 5d, a frame number specifying unit 5e, and an image specifying unit 5f.

The image processing unit 5 consists of, for example, a predetermined logic circuit. However, the image processing unit 5 is not limited to the above example.

The image acquisition unit 5a acquires images to be subjected to an image specifying process, which will be explained below.

Figure 5:
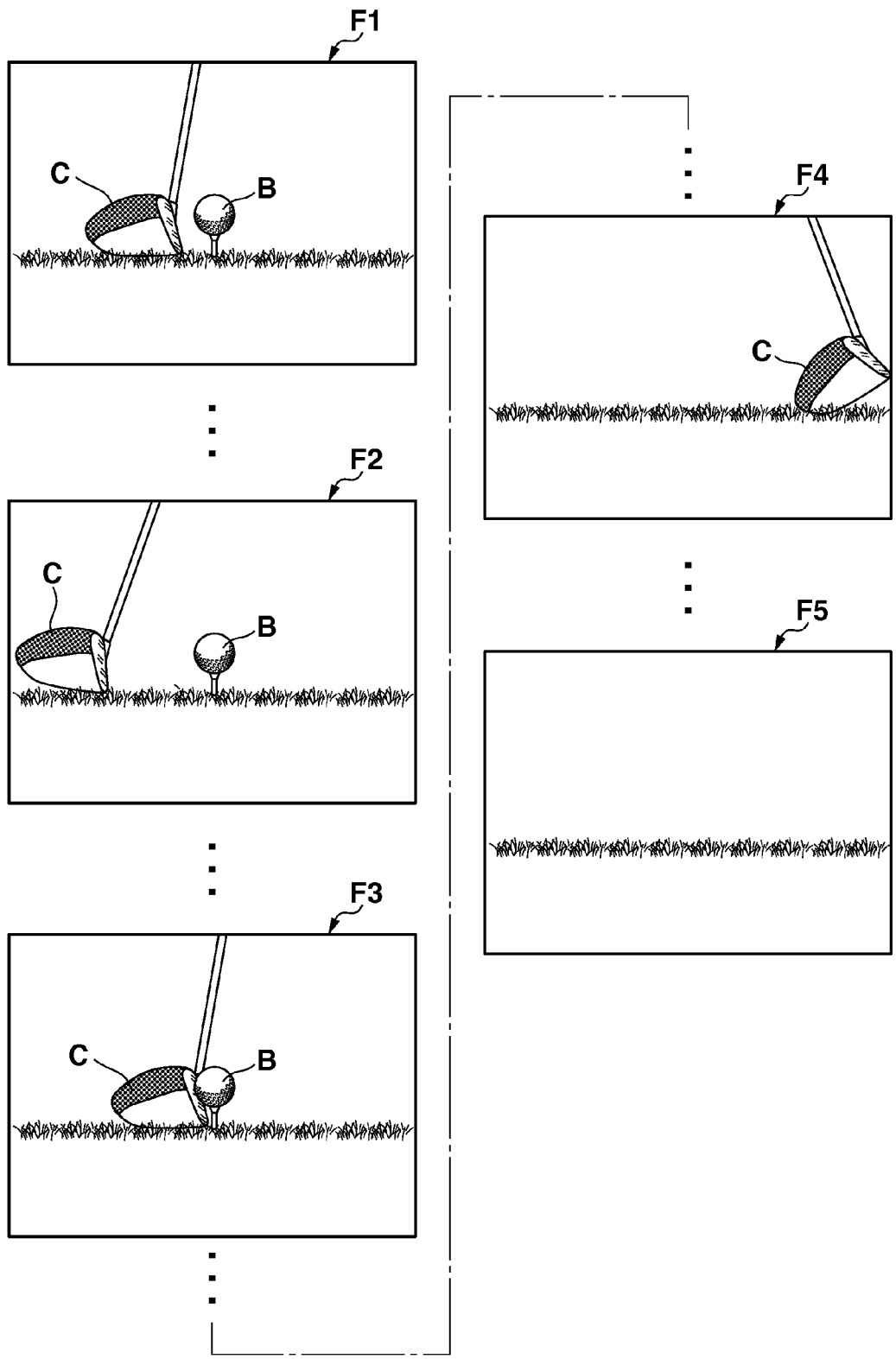
FIG. 5 is a view schematically showing moving image data according to the image processing of FIG. 2.

That is, the image acquisition unit 5a acquires a plurality of pieces of frame image data (refer to FIG. 5) having the frame numbers F1 to F5, which are obtained by continuously photographing the moving object. More specifically, the image acquisition unit 5a acquires, as a target to be subjected to the image specifying process, the moving image data consisting of plural pieces of frame image data, which are generated by the image-data generation unit 4 using the image capture unit 3 to photograph a predetermined athletic motion performed by a person (e.g. motion of the golf club head C).

For example, the image capture unit 3 captures, at a predetermined frame rate (e.g. 1000 fps.), motion performed by the person while he/she is playing a predetermined sport to successively generate plural pieces of frame image data. The image-data generation unit 4 produces moving image data consisting of the plural pieces of frame image data, which are given the frame numbers in order of time, respectively, and transmits the moving image data to the memory 2. When the image capture unit 3 photographs the object (the person), it is possible to display an indicator image data M in a live view image data L on the display unit 7 in an overlapping manner for adjusting the initial positions of the club head C and a golf ball B, as shown in FIG. 4.

The image acquisition unit 5a reads the moving image data from the memory 2 and acquires the moving image data as the target to be subjected to the image specifying process.

It is also possible for the image acquisition unit 5a to read the moving image data which is recorded in the image recording unit 6 after the image capture unit 3 captures the object.

The area setting unit 5b sets a plurality of specification areas for specifying the frame number of a moment (hereinafter, referred to as the "move-in moment") when the object has just moved in a photographing range and the frame number of a moment (hereinafter, referred to as the "move-out moment") when the object is just about to move out from the photographing range.

Figure 6A:
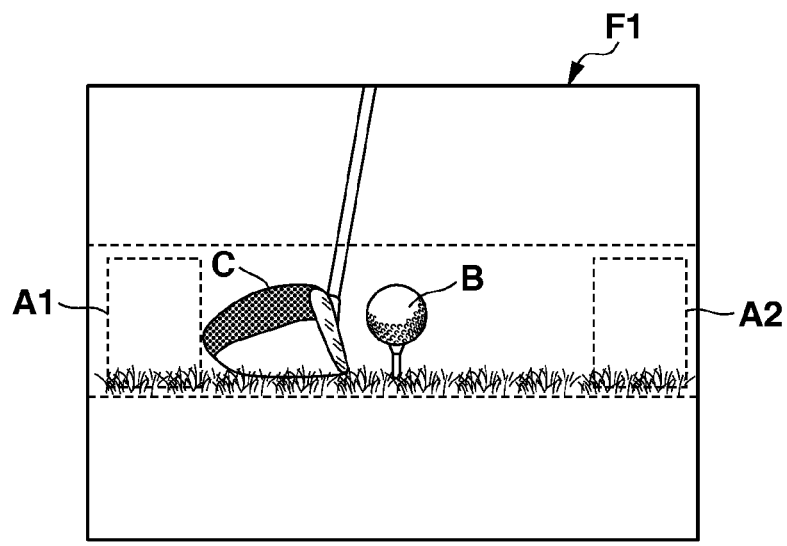
FIG. 6A is a view schematically showing an example of frame image data for explaining the image specifying process of FIG. 3.
Figure 6B:
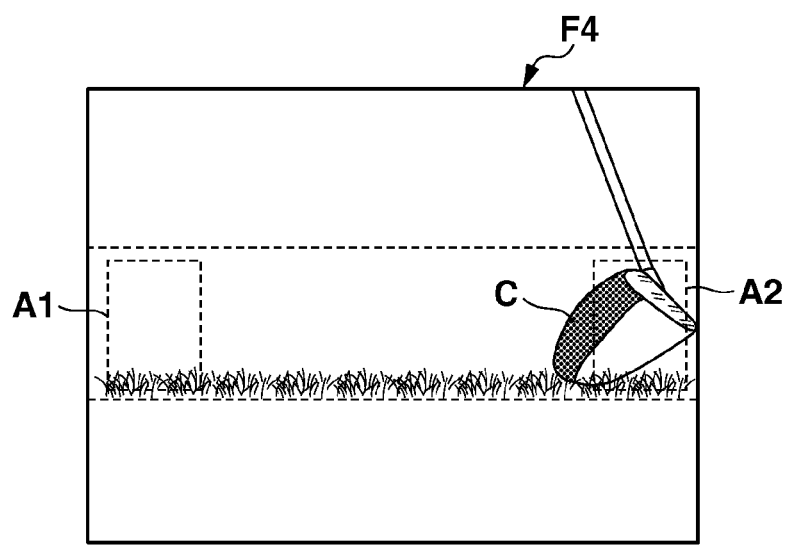
FIG. 6B is a view schematically showing an example of frame image data for explaining the image specifying process of FIG. 3.
Figure 6C:
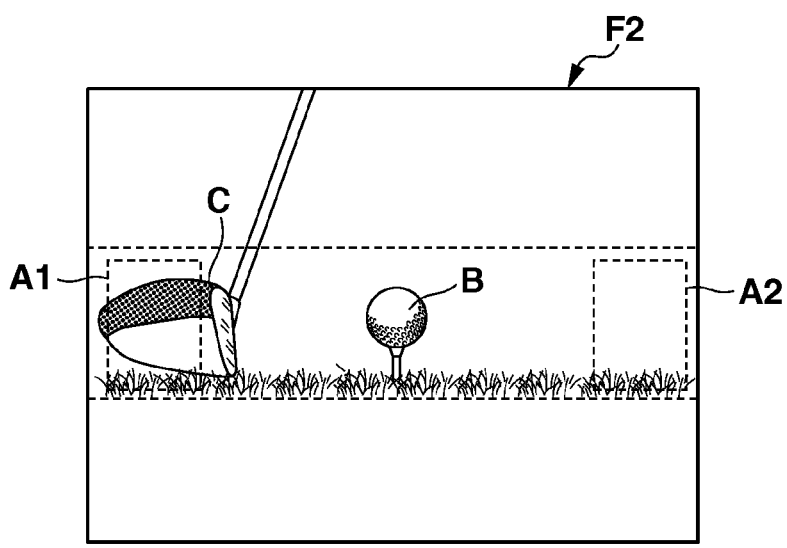
FIG. 6C is a diagram schematically showing an example of frame image data for explaining the image specifying process of FIG. 3.

That is, the area setting unit 5b sets, at predetermined positions in each of the plurality of pieces of frame image data constituting the moving image data, the plurality of specification areas for specifying frame numbers of the moments when the object exists in the plurality of specification areas. More specifically, the area setting unit 5b sets, on the left and right sides of each (photographing area) of the plural pieces of frame image data, two substantially rectangular specification areas, as shown in FIG. 6A to FIG. 6C. The locations of the specification areas can be determined on the basis of the direction in which the club head C is moved while the person swings the golf club. That is, the area setting unit 5b sets at least two specification areas, A1 and A2, at the left and right sides of each piece of frame image data (photographing area), with respect to the object which moves in the horizontal direction. Further, with respect to the object (not shown) moving in the vertical direction, the area setting unit 5b sets the two specification areas, A1 and A2, at the top and bottom of each piece of frame image data (photographing area).

The area setting unit 5b sets the plural specification areas at the predetermined locations in the initial piece F1 (FIG. 6A) of frame image data, and then sets the specification areas in the remaining pieces of frame image data at the locations corresponding to the initial frame image data.

The positions or locations, the number, and shape of the specification area are merely examples and can be arbitrarily changed.

The decoding unit 5c decodes the moving image data consisting of the plurality of frame image data.

More specifically, the decoding unit 5c performs an appropriate decoding process on the moving image data encoded in a predetermined compression format (e.g. a MPEG format, a motion JPEG format, and the like) to generate YUV data of the plurality of frame image data.

The decoding unit 5c can perform a size reduction process on the moving image data to change the size of the frame image data to a predetermined size (e.g. VGA size or QVGA size).

The threshold setting unit 5d sets a plurality of threshold values for specifying the frame numbers of the move-in moment and/or the move-out moment.

That is, the threshold setting unit 5d sets, as the threshold values for specifying the frame numbers of the move-in moment and/or the move-out moment, a plurality of representative values calculated from pixel values of the plurality of specification areas in a predetermined plural number of frame image data falling within a predetermined period. More specifically, the threshold setting unit 5d calculates Sum of Squared Differences ("SSD") of pixel values (e.g. luminance values) of the specification areas set at the corresponding locations in the adjacent frame image data among the prescribed number (for example, "n" is a natural number) of frame image data decoded by the decoding unit 5c, counted from the initial frame image data F1, and further calculates Sum of Squared Differences ("SSD") of the pixel values of the specification areas (e.g. one of the specification areas A1 and A2) set at other locations in the prescribed number of frame image data. Then, the threshold value setting unit 5d calculates the representative values (e.g. an average value, a median value) of the respective specification areas from among the plural (for example, n−1 pieces) "SSD" calculated for the respective specification areas set at the different positions, and sets the calculated representative values as the threshold values for specifying the frame numbers of the moments (e.g. the move-in moment and the move-out moment) when the object exists in the plurality of specification areas.

The above methods of calculating the threshold values are merely examples and may be arbitrarily changed. The threshold value setting unit 5d can use one (e.g. the representative value of the left specification area A1) of the representative values of the specification areas as the representative value for another specification area (e.g. the right specification area A2), in the case in which the background color in the frame image data is only one and/or the pattern in the frame image data is uniform.

The frame number specifying unit 5e specifies the plural frame numbers of the moments (e.g. the move-in moment and the move-out moment) when the object exists in plural specification areas.

That is, the frame number specifying unit 5e specifies, based on change in evaluation values of the plural specification areas set by the area setting unit 5b, the frame numbers of the moments when the object exists in the specification areas set by the area setting unit 5b (e.g. the frame numbers of the move-in moment and the frame numbers of the move-out moment). More specifically, the frame number specifying unit 5e judges whether the evaluation values of the specification areas are larger than the corresponding threshold values set by the threshold value setting unit 5d, respectively. When it is determined that the evaluation values of the specification areas set at the different positions are larger than the corresponding threshold values, the frame number specifying unit 5e specifies the frame numbers of the moments when the evaluation values of the specification areas set at the different positions exceed the corresponding threshold values (refer to FIG. 6B and FIG. 6C).

For example, the frame number specifying unit 5e calculates, as the evaluation values, SSD of the pixel values (for example, luminance values) of the specification areas set at the corresponding positions in the adjacent pieces of frame image data among the plural pieces of frame image data decoded by the decoding unit 5c. Then, the frame number specifying unit 5e compares the calculated evaluation values with the corresponding threshold values set by the threshold value setting unit 5d, and judges whether the calculated evaluation values are larger than the corresponding threshold values. As a result of the comparison, the frame number specifying unit 5e specifies the frame number of the moment when the evaluation value has exceeded the corresponding threshold value. For example, the evaluation values will be larger than the corresponding threshold values, when the club head C is swung in the horizontal direction to pass through the plural specification areas when it is determined that the evaluation values of the plural specification areas at the different positions are larger than the corresponding threshold values, the frame number specifying unit 5e specifies the frame number of the moment when a difference between the evaluation value and the corresponding threshold value will be largest.

That is, when the club head C moving in the horizontal direction passes through the specification area, the evaluation value of the specification area will be larger than the corresponding threshold value, and when an area where the club head C and the specification area overlap each other will be largest, the difference between the evaluation value and the corresponding threshold value will be largest. In general, the evaluation value will be larger than the corresponding threshold value when the hit ball B passes through the specification area (e.g. the specification area A2 where the club head C will also pass through after the hit ball B). Meanwhile, the evaluation value of the specification area when the club head C passes through said specification area will be larger than the evaluation value of the specification area when the hit ball B passes through said specification area, which is caused by difference in size between the club head and the golf ball. Therefore, it is considered that the club head C will exist within the specification area set in the frame image data corresponding to the evaluation value whose difference from the threshold value is largest.

The frame-number specifying process for specifying the frame number in the specification areas A1 and A2 may be performed on the specification area A2 prior to the specification area A1 (refer to FIG. 6B). That is, the golf swing by the right-handedness person has a predetermined trajectory of the club head C, i.e. the club head C comes into the photographing area from the outside on its left side and leaves the photographing area to the outside on its right side, and therefore the frame number specifying process should be performed on the specification area A2 prior to the specification area A1 as will be explained below. On the other hand, the frame number specifying process should be performed on the specification area A1 prior to the specification area A2 in the case of the left-handed player.

The frame number specifying unit 5e performs the frame number specifying process on all of the frame image data decoded by the decoding unit 5c, when the frame number of the move-out moment is specified on the specification area A2 (refer to FIG. 6B). On the other hand, the frame number specifying unit 5e performs the frame number specifying process on the predetermined number of frame image data, which predetermined number is counted on the basis of the frame number of the move-out moment, when the frame number of the move-in moment is specified on the specification area A1 (refer to FIG. 6B). For example, in consideration of a standard speed of a golf swing (30-40 m/s etc.), a frame rate for capturing images by the image capturing unit 3, and an angle of view, the frame number specifying unit 5e specifies the predetermined number of frame image data, counted in descending order from the frame image data of the move-out moment when the object moves out from the specification area A2. Then, the predetermined number of frame image data from the frame image data the predetermined frame number before the frame image data of the move-out moment to the last frame image data before the frame image data with the frame number of the move-out moment are targets for the frame number specifying process to be executed by the frame number specifying unit 5e.

The club head C passes through the specification area A1 in time of a taking-back motion and in time of a swinging-down motion of the golf swing. The above method of the frame number specifying process can reduce a possibility that the frame number of the moment when the club head C in the time of the taking-back motion exists in the specification area A1 is wrongly specified as the frame number of the moment when the club head C in the time of the swinging down.

The frame image specifying unit 5f specifies a plurality of pieces of frame image data based on the predetermined moment of the motion of the object.

That is, the frame image specifying unit 5f specifies the plurality of pieces of frame image data related to the predetermined moment (e.g. the hit moment when the ball B is hit by the club head C) based on the results of the frame number specifying process executed by the frame number specifying unit 5e. More specifically, the frame image specifying unit 5f specifies frame image data F2 and F4 corresponding to the frame number F2 of the move-in moment and the frame number F4 of the move-out moment, respectively, based on the results of the frame number specifying process by the frame number specifying unit 5e, i.e. the frame number of the move-in moment and the frame number of the move-out moment. The frame image specifying unit 5f specifies the plurality of pieces of frame image data between the frame numbers F2 and F4 based on the two specified frame numbers, and extracts, as moving image data, the plurality of pieces of frame image data between the frame numbers F2 and F4.

The frame image specifying unit 5f can specify frame image data F3 of the hit moment when the ball B is hit by the club head C between the frame image data F2 and F4, in consideration of the relative positions among the initial positions of the ball B and the club head C, and the positions of the specification areas A1 and A2. It can be considered that the frame image data F3 exists between the two pieces of frame image data F2 and F4, in the case in which the position of the ball B is arranged substantially at a position between the specification areas A1 and A2, for example.

The image recording unit 6 is constituted of a non-volatile memory (e.g. a flash memory). The image recording unit 6 records a plurality of items of image data encoded in a predetermined coding system by an encoding unit (not shown) of the image data generation unit 4.

More specifically, the image recording unit 6 records the moving image data where a series of motion of the object has been sequentially captured by the image capture unit 3, and the moving image data constituted of the plurality of pieces of frame image data.

The image recording unit 6 can be structured such that a storage medium (not shown) is attachable and image data can be read from and/or written on said attached storage medium.

The display unit 7 displays still image data and/or moving image data. Specifically, the display unit 7 includes the display panel 7a and the display control unit 7b.

The display panel 7a displays image data in a display area of the display panel 7a. More specifically, the display unit 7 displays live-view image data L, while successively renewing at a predetermined frame rate plural pieces of frame image data captured by the image capture unit 3 in a still image capture mode and/or in a moving image capture mode.

The display panel 7a comprises a liquid crystal display panel, an organic EL display panel or the like. However, these are merely examples and the display panel is not limited to the above examples.

The display control unit 7b controls the display panel 7a to display a predetermined image with a predetermined size on its screen based on the image read from the image record unit 6 and decoded by the image processing unit 5. The display control unit 7b includes a VRAM (Video Random Access Memory), VRAM controller, digital video encoder, and the like. The digital video encoder reads the luminance signal Y and the color difference signals Cb and Cr from the VRAM (not shown) via the VRAM controller, generates video signals based on the read data, and outputs the generated video signals to the display panel 7a.

The operation input unit 8 inputs plural kinds of instructions to the image capture apparatus 100.

The operation input unit 8 includes an operation unit (not shown) having plural types of buttons and the like which are used for selecting modes and functions of the image capture apparatus 100.

When a user operates one of the buttons of the operation unit, the operation input unit 8 outputs an instruction to the central control unit 1 in response to the operation of the user. The central control unit 1 controls the units of the image capture apparatus 100 to perform a predetermined function (e.g. capture of a object and the like) of the image capture apparatus 100 (e.g. capture of a object and the like) according to the instruction input from the operation input unit 8. The operation input unit 8 can include a touch panel united with the display panel 7a of the display unit 7.

Next, a capture process will be explained with reference to the drawings from FIG. 2 to FIG. 6.

Figure 2:
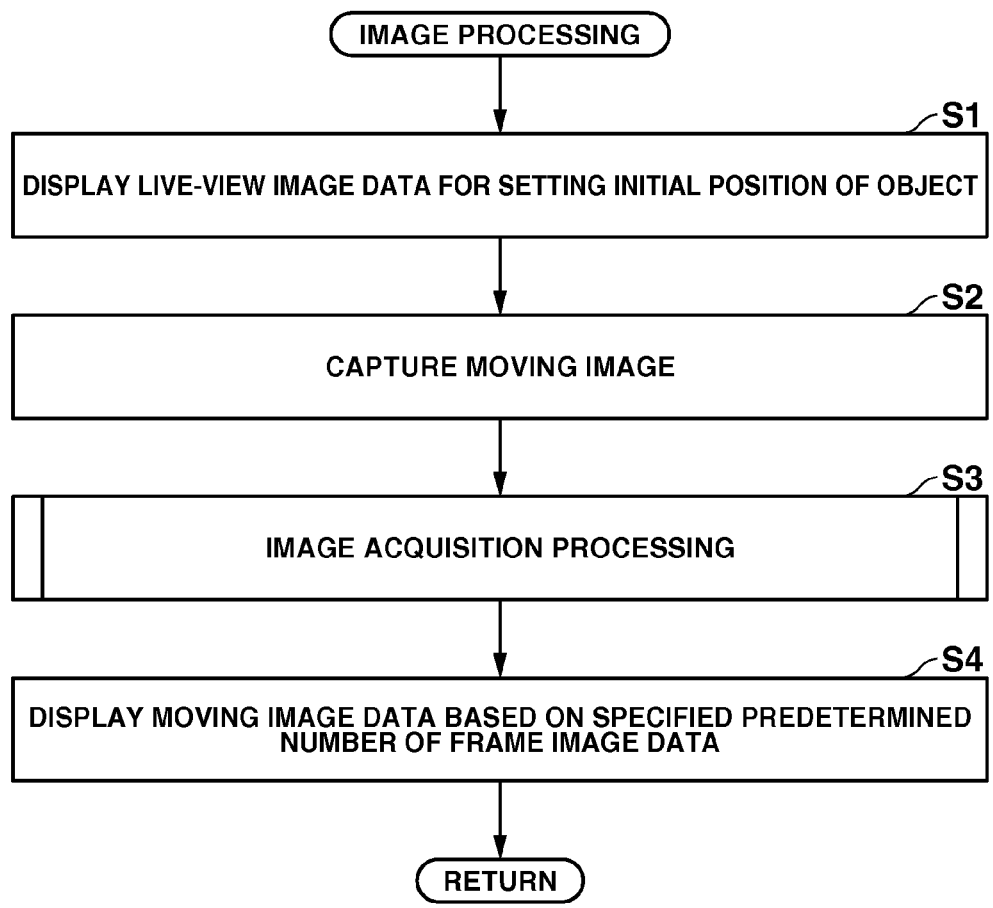
FIG. 2 is a flow chart showing an example of an image capture process performed in the image capture apparatus of FIG. 1.

FIG. 2 is a flow chart showing an example of an image capture process.

The image capture process is a process which will be executed, when an hit image extraction mode is selected from among a plurality of process modes which are displayed on a menu screen (not shown) in accordance with the user's predetermined operation onto the operation input unit 8.

<Image Capture Process>

As shown in the flowchart of FIG. 2, the display control unit 7b displays on the display panel 7a the live-view image data L with the indicator image data M (e.g. shapes of a club head and a golf ball) displayed in an overlapping manner (or in a manner of OSD format) for adjusting the initial positions of the club head C and the golf ball B (step S1, FIG. 4). In this situation, a photographer adjusts a distance between the image capture apparatus 100 and the object, and an angle of view of the image capture unit 3, and the like such that the initial positions of the image data of the club head C and the ball B are correctly superimposed on the indicator image data M at suitable positions.

Then, when the user has operated the operation input unit 8 to input the instruction for the completion of adjusting the distance, and the angle of view, and the like to the image capture apparatus 100, the display control unit 7 stops displaying the indicator image data M at the predetermined display area in the overlapping manner (or in the manner of OSD format). The shape of the indicator image data M is prepared according to the dominant hand of the person and the shape of the indicator image data M as shown in FIG. 4 is for the right-handedness. The capture of the object may be performed in a situation that the image capture apparatus 100 is fixed on a tripod or in a situation that the photographer holds the image capture apparatus 100 in its hand.

When the user has operated the operation input unit 8 to input the instruction for capturing, the image capture unit 3 captures the motion of the club head C at a predetermined frame rate (e.g. 1000 fps and the like) and the image data generation unit 4 generates the moving image data consisting of plural pieces of frame image data encoded in a predetermined coding system (step S2). Then, the image data generation unit 4 transmits the generated moving image data to the memory 2.

The image processing unit 5 performs the image specifying process (refer to FIG. 3) for specifying and extracting the predetermined plural number of frame image data from the moving image data (step S3). The image specifying process will be explained in detail below.

The display control unit 7b displays the moving image data on the display panel 7a based on the predetermined plural number of frame image data specified and extracted by the image specifying unit 5f (step S4). Then, the capture process is completed.

<Image Specifying Process>

Figure 3:
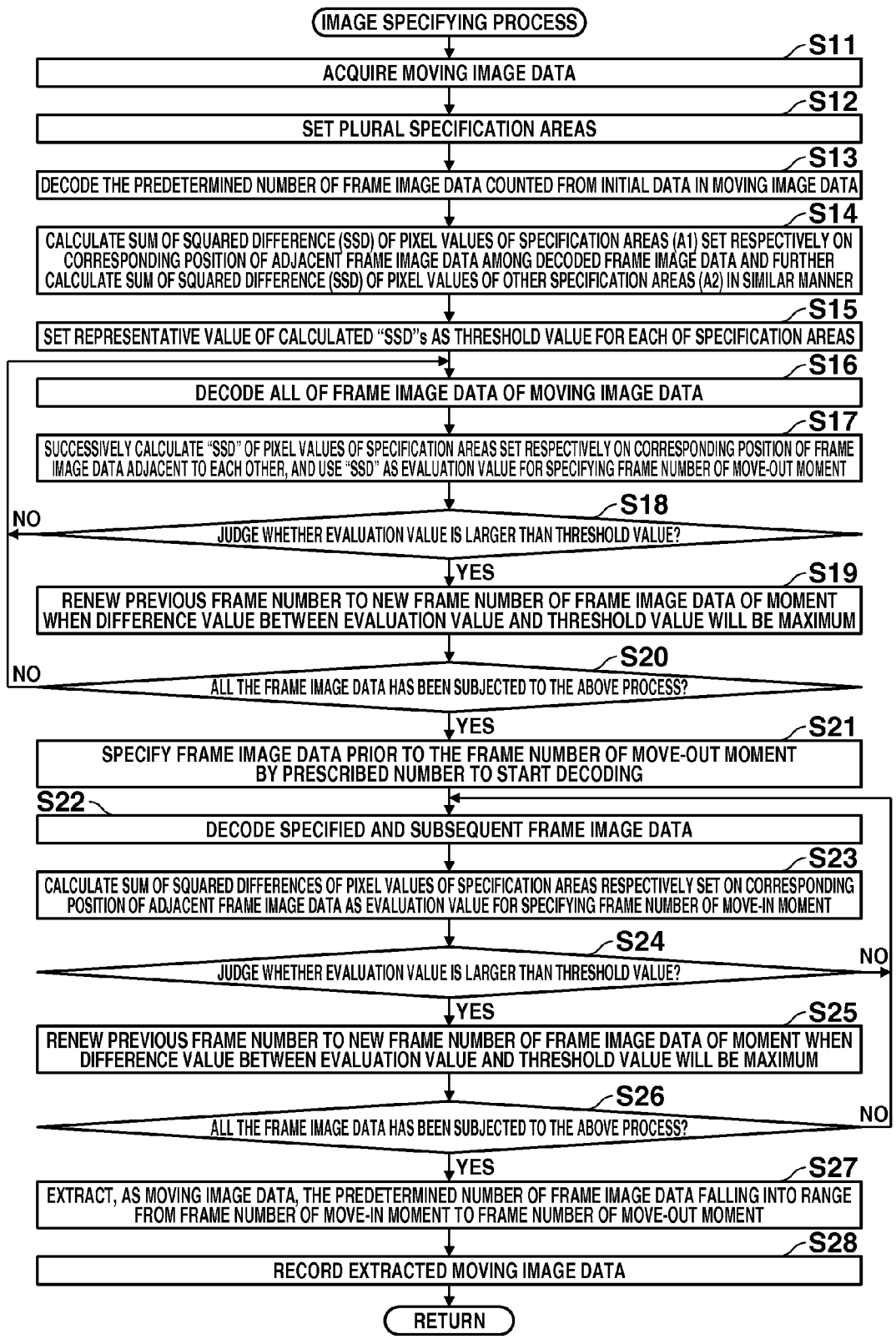
FIG. 3 is a flow chart showing an example of an image specifying process performed in the image capture apparatus of FIG. 1.

In the following, the image specifying process will be explained in detail with reference to FIG. 3. FIG. 3 is a flow chart showing an example of the image specifying process.

As shown in FIG. 3, the image acquisition unit 5a reads from the memory 2 the moving image data consisting of plural pieces of frame image data where the motion of the club head C in the golf swing is sequentially captured and acquires the moving image data as a target to be subjected to the image specifying process (step S11).

The area setting unit 5b sets two rectangular specification areas A1, A2 on the left side and the right sides of each of the plural pieces of frame image data composing the moving image data (Step S12). In a case in which the person is right-handed, the specification area A1 set on the left side of the photographing range is an area where the club head C exists just after moving into the photographing range from outside, in other words, the area where the club head C enters and leaves first when the club head C passes through the photographing range, and the specification area A2 set on the right side of the photographing range is an area where the club head C exists just before moving out from the photographing range to outside, in other words, the area where the club head C enters and leaves subsequently when the club head C passes through the photographing range.

The decoding unit 5c decodes the predetermined number (e.g. n is a natural number) of frame image data counted from the initial frame image data F1 among the moving image data (step S13). The threshold value setting unit 5d calculates SSD of pixel values (e.g. luminance values) of the specification areas A1 set respectively on two pieces of frame image data adjacent to each other among the predetermined number of frame image data. Further, the threshold value setting unit 5d calculates SSD of pixel values of the specification areas A2 in the same manner (step S14). Then, the threshold setting unit 5d calculates a representative value (an average value, a median value or the like) of plural "SSD"s (n−1 of "SSD"s) for the specification area A1 and sets the calculated representative value as the threshold value for specifying the frame numbers of the move-in moment. Further, the threshold setting unit 5d calculates a representative value of plural "SSD"s (n−1 of "SSD"s) for the specification area A2 and sets the calculated representative value as the threshold value for specifying the frame numbers of the move-out moment (step S15).

The decoding unit 5c starts decoding the plural pieces of frame image data composing the moving image data from the initial frame image data F1 (step S16). The frame number specifying unit 5e sequentially calculates, as the evaluation values, SSD of pixel values (e.g. luminance values) of the specification areas A2 set respectively on two pieces of frame image data adjacent to each other among the decoded frame image data (step S17). The frame number specification unit 5e judges whether the calculated evaluation values are larger than the threshold value of the specification area A2 set by the threshold value setting unit 5d (step S18).

When it is determined that the evaluation values are not larger than the threshold value of the specification area A2 (NO at step S18), the image processing unit 5 returns to the process at step S16 and executes the subsequent processing. In other words, it is considered that the change in the evaluation values for the specification area A2 has not occurred because the club head C has not yet passed through the specification area A2. On the other hand, it can be considered that the club head C still remains in the specification area A2 when no change in the evaluation values for the specification area A2 occurs.

When it is determined that the evaluation values are larger than the threshold value of the specification area A2 (YES at step S18), the frame number specifying unit 5e calculates difference values between the evaluation values and the corresponding threshold value, and specifies the frame number of the moment corresponding to the evaluation value showing the maximum difference, and then temporarily stores said frame number of the frame image data in a memory (e.g. memory 2) (step S19), thereby renewing data previously stored therein. Further, the image processing unit 5 judges whether all pieces of frame image data have been subjected to the above process (step S20).

When it is determined that all pieces of frame image data have not been subjected to the above process (NO at step 20), the image processing unit 5 returns to the process at step S16 and executes the subsequent processing.

The above process is repeatedly performed on the remaining frame image data until it is determined that all pieces of frame image data have been subjected to the above process (YES at step S20).

When the above frame number specifying process has been performed, the frame number F4 can be specified, of the moment when the difference value between the evaluation value and the threshold value of the specification area A2 is largest, that is, the frame number F4 can be specified, of the moment at which an area where the club head C moving in the horizontal direction overlaps with the specification area A2 will be largest (refer to FIG. 6B).

The decoding unit 5c specifies the frame image data from which the decoding operation starts, said frame image data being prior to the frame image data having the frame number F4 of the move-out moment specified on the specification area A2 by the prescribed frame number (step S21). Further, the decoding unit 5c specifies frame image data to be decoded, which frame image data contains the frame image data specified at step S21 and the frame image data falling between the frame image data specified at step S21 and the frame image data prior to the frame image data of the frame number F4 by one frame number.

The decoding unit 5c sequentially decodes the frame image data following the specified frame image data (step S22), and the frame number specifying unit 5e sequentially calculates, as the evaluation values, SSDs of pixel values (e.g. luminance values) of the specification areas A1 set respectively in the decoded frame image data adjacent to each other (step S23).

Then, the frame number specifying unit 5e judges whether the calculated evaluation values are larger than the threshold value of the specification area A1 (step S24).

When it is determined that the evaluation values are not larger than the threshold of the specification area A1 (NO at step S24), the image processing unit 5 returns to the process to step S22 and executes the subsequent processing for the next frame number. In other words, it will be considered that the change in the evaluation values of the specification area A1 has not occurred because the club head C has not yet passed through the specification area A1. On the other hand, it will be considered that the club head C still remains in the specification area A1 when no change in the evaluation values of the specification area A1 occurs.

When it is determined that the evaluation values are larger than the threshold value of the specification area A1, the frame number specifying unit 5e calculates difference values between the evaluation values and the threshold value of the specification area A1, and then specifies the frame number of the moment corresponding to the evaluation value showing the maximum difference. The frame number specification unit 5e temporarily stores said frame number of the frame image data in the memory (e.g. memory 2) (step S25), thereby renewing the frame number for specifying the frame image data of the move-in moment previously stored therein. Then, the image processing unit 5 judges whether the above each process have been performed on all pieces of frame image data to be processed (step S26).

When it is determined that all pieces of frame image data have not been processed (NO at step 26), the image processing unit 5 returns to the process at step S22 and executes the subsequent processing. The above processes are repeatedly performed on the remaining frame image data until it is determined that all the frame image data has been subjected to the above process (YES at step S26).

When the above frame number specifying process has been performed, the frame number of the frame image data F2 can be specified, of the moment when the difference value between the evaluation value and the threshold value of the specification area A1 is largest, that is, the frame number of the frame image data F2 can be specified, of the moment at which an area where the club head C moving in the horizontal direction overlaps with the specification area A1 will be largest (refer to FIG. 6C).

From among plural pieces of frame image data relating to a first image data group, the image specifying unit 5f specifies the prescribed number of frame image data relating to a second image data group, remaining between the specified frame number of the move-in moment and the specified frame number of the move-out moment, and extracts moving image data form the second image data group (step S27). It is possible for the image specifying unit 5f to specify plural pieces of frame image data falling into the range between the frame image data of the frame number prior to the specified frame number of the move-in moment by the prescribed number and the frame image data of the frame number behind the specified frame number of the move-out moment by the prescribed number, thereby extracting the second image data group.

When the number of the frame image data between the frame number F2 of the move-in moment and the frame number F4 of the move-out moment is larger than a prescribed number and/or the corresponding time duration is longer than a prescribed time duration, there is a possibility that an object other than the club head C passes through between the specification areas. Therefore, the image specification unit 5f can be made to extract the moving image data only when the number of frame image data or the time interval is the prescribed one or less.

The image recording unit 6 records the moving image data extracted by the image specifying unit 5f and finishes the image specifying process (step S28). The moving image data consists of the prescribed number of frame images data counted from the predetermined moment.

As described above, in the image capture apparatus 100 according to the embodiment of the invention, plural pieces of frame image data are produced by continuously photographing the motion of the object, and plural specification areas are set at the plural positions on each piece of frame image data, and pixel values of the specification areas of the plural pieces of frame image data are calculated, and then plural pieces of frame image data relating to the prescribed moments in motion of the object are specified from among the plural pieces of frame image data based on change in the calculated pixel values which change appears between the plural pieces of frame image data. Therefore, using the change in the pixel values of the specification areas set on each of the plural pieces of frame image data, the frame image data (e.g. frame images data from the frame image data F2 to the frame image F4) desired by the user can be specified without using a special device.

For example, it is possible to specify the user's intended images including a frame image data of the hit moment when the club head C and the ball B hit each other even when a person would make a practice golf swing.

It should be noted that the scope of the present invention is not limited to the exemplary embodiment above explained but includes the scope of the original claims as well as the present claims and equivalents thereof.

For example, in the above embodiment of the invention, the frame numbers of the move-in moment and the move-out moment are specified on the basis of the threshold values set for the specification areas. This method of specifying the frame numbers is not limited to the above exemplary embodiment. It is optional to include the step. In other words, the image capture apparatus 100 is not required to include the threshold value setting unit 5d but any structure is applicable as far as it can accurately specify the frame numbers of the move-in moment and the move-out moment based on the change of evaluation values.

In the above embodiment of the invention, the frame number specifying process is performed on the specification area A2 prior to the specification area A1. However, this is merely an example and the scope of the invention is not limited to the above exemplary embodiment. The frame number specifying process may be performed on the specification area A1 prior to the specification area A2. In this case, all the frame image data decoded by the decoding unit 5c may be targets to be subjected to the frame number specifying process for specifying the frame number of the move-in moment using the specification area A1 while a predetermined number of frame image data are targets for specifying, based on the specified frame number of the move-in moment, the frame number of the move-out moment using the specification area A2.

In the above embodiment, the frame number specifying unit 5e specifies the frame number corresponding to the evaluation value showing the largest difference from the threshold value from among frame numbers corresponding evaluation values showing differences larger than the threshold values. However, when there are a plurality of evaluation values which are larger than the corresponding threshold values and are near to the largest evaluation value, the frame numbers of the move-in moment or the move-out moment may be specified based on a predetermined specifying process which performs on the plurality of evaluation values.

That is, when the frame number of the move-in moment is specified, it is possible to use a process which specifies the latest frame number from among plural frame numbers corresponding to the evaluation values close to the maximum. Using such process, it is possible to reduce a possibility of wrongly specifying, as the desired frame number of the move-in moment, motion between address-posture and top-posture in golf from among motions such as motion between the address-posture and the top-posture and motion between the top-posture and the hit-posture. In the same manner, for specifying the frame number of the move-out moment, it is possible to include a process of specifying the latest frame number as the frame number of move-out moment from among plural frame numbers corresponding to the evaluation values close to the maximum.

In the above embodiment, the image specifying unit 5f specifies the identification information (e.g. the frame numbers of the move-in moment and the move-out moment) relating to the frame image data F2 and F4, and then specifies the frame image data F2 and F4 corresponding to the identification information. The above method of specifying the frame image data F2 and F4 is merely an example and it is not always required to specify the frame image data F2 and F4. That is, it is possible for the frame number specifying unit 5f to directly specify frame image data relating to the a predetermined moment of motion of the object from among plural pieces of frame image data composing the moving image data based on the frame numbers specified by the frame number specifying unit 5e.

The structure of the image capture apparatus 100 is merely examples and the scope of the invention is not limited to them. Further, the image capture is illustrated, as an image process apparatus, by an example and the scope of the invention is not limited to the description herein.

In the above embodiment, the functions of the image acquisition unit 5a, the area setting unit 5b, and the image acquisition unit 5f are realized under control of the central control unit 1. However, it is also possible for CPU of the central control unit 1 to realize such functions by running a predetermined program (not shown). Specifically, a program including image acquiring routine, area setting routine, and image specifying routine is stored in a program memory (not shown). And the image acquiring routine may cause the CPU of the central control unit 1 to function as an image acquiring means for acquiring a first image group including a plurality of images representing motion of the object.

In the same manner, the area setting routine may cause the CPU of the central control unit 1 to function as an area setting means for setting a plurality of specification areas at a plurality of positions on the frame image data in the first image group. Further, the image specification routine may cause the CPU of the central control unit 1 to function as image specifying means for specifying the first image group including plural pieces of frame image data, a second image group including plural pieces of frame image data, relating to a predetermined moment of motion of the object, based on change in pixel values of the plural specification areas between the plural pieces of frame images data of the first group.

Similarly, it is possible to make CPU of the central control unit 1 run a program to perform functions of the other units.

The following memories can be used for storing the program to carry out the processes explained above, that is, a non-volatile memory such as a flash memory, a portable record memory such as a CD-ROM as well as a ROM or a hard disc used as a computer readable medium. Furthermore, a carrier wave may be used as a medium for providing program data through a predetermined communication line.

It should be noted that the scope of the present invention is not limited to the exemplary embodiments above explained but includes the scope of the original claims as well as the present claims and equivalents thereof. The entire disclosure of Japanese Patent Application No. 2013-203332 filed on Sep. 30, 2013 including specification, claims, drawings and summary is incorporated herein by reference in its entirety.

What is claimed is:

1. An image processing apparatus comprising:
   an acquisition unit which acquires a first image group including plural images, the plural images being obtained by sequentially photographing motion of an object;
   an area setting unit which sets plural areas at plural positions on each of the images of the first image group acquired by the acquisition unit;
   a threshold value setting unit which sets representative values of pixel values of the plural areas of a prescribed number of images falling within a prescribed period as threshold values for specifying plural images relating to specific moments of motion of the object;
   a first calculation unit which calculates respective evaluation values for each of the plural areas set on each of the plural images;
   a determination unit which determines whether the respective evaluation values calculated by the first calculation unit for each of the plural areas are larger than corresponding ones of the representative values; and
   a specifying unit which acquires pixel values of the plural areas set on each of the images by the area setting unit, and specifies a first image having plural areas in which the object appears, the first image being photographed first, and a second image having plural areas in which the object appears, the second image being photographed latest, from among plural images of a second image group, the second image group including the plural images relating to the specific moments of motion of the object from among the first image group including the plural images, and the specifying unit specifying the first image and the second image based on a change in the acquired pixel values of the plural areas when the determination unit determines that the evaluation values of the plural areas are larger than the corresponding threshold values.

2. The image processing apparatus according to claim 1, further comprising:
   a second calculation unit which calculates one of an average value and a median value of the pixel values of the areas set on the prescribed number of images acquired by the acquisition unit, and
   wherein the threshold value setting unit sets the one of the average value and the median value calculated by the second calculation unit as one of the representative values.

3. The image processing apparatus according to claim 1, further comprising:
   an extracting unit which extracts, as a moving image, the plural images relating to the specific moments of motion of the object.

4. A method of specifying images in an image processing apparatus, the method comprising:
   acquiring a first image group including plural images, the plural images being obtained by sequentially photographing motion of an object;

setting plural areas at plural positions on each of the images of the first image group;

setting representative values of pixel values of the plural areas of a prescribed number of images falling within a prescribed period as threshold values for specifying plural images relating to specific moments of motion of the object;

calculating respective evaluation values for each of the plural areas set on each of the plural images;

determining whether the respective evaluation values calculated for each of the plural areas are larger than corresponding ones of the representative values; and acquiring pixel values of the plural areas set on each of the images, and specifying a first image having plural areas in which the object appears, the first image being photographed first, and a second image having plural areas in which the object appears, the second image being photographed latest, from among plural images of a second image group, the second image group including the plural images relating to the specific moments of motion of the object from among the first image group including the plural images, and the first image and the second image being specified based on a change in the acquired pixel values of the plural areas when it is determined that the evaluation values of the plural areas are larger than the corresponding threshold values.

5. A non-transitory computer-readable storage medium with an executable program stored thereon, wherein the program is executable to control a computer to perform functions comprising:

acquiring a first image group including plural images, the plural images being obtained by sequentially photographing motion of an object;

setting plural areas at plural positions on each of the images of the first image group;

setting representative values of pixel values of the plural areas of a prescribed number of images falling within a prescribed period as threshold values for specifying plural images relating to specific moments of motion of the object;

calculating respective evaluation values for each of the plural areas set on each of the plural images;

determining whether the respective evaluation values calculated for each of the plural areas are larger than corresponding ones of the representative values; and acquiring pixel values of the plural areas set on each of the images, and specifying a first image having plural areas in which the object appears, the first image being photographed first, and a second image having plural areas in which the object appears, the second image being photographed latest, from among plural images of a second image group, the second image group including the plural images relating to the specific moments of motion of the object from among the first image group including the plural images, and the first image and the second image being specified based on a change in the acquired pixel values of the plural areas when it is determined that the evaluation values of the plural areas are larger than the corresponding threshold values.

6. An image processing apparatus comprising:

an acquisition unit which acquires a first image group including plural images, the plural images being obtained by sequentially photographing motion of an object;

an area setting unit which sets plural areas at plural positions on each of the images of the first image group acquired by the acquisition unit;

a threshold value setting unit which sets representative values of the pixel values of the areas of a prescribed number of images falling within a prescribed period as threshold values for specifying plural images relating to specific moments of motion of the object;

a calculation unit which calculates one of an average value and a median value of the pixel values of the areas set on the prescribed number of images acquired by the acquisition unit, the threshold value setting unit setting the one of the average value and the median value calculated by the calculation unit as one of the representative values; and a specifying unit which acquires pixel values of the plural areas set on each of the images by the area setting unit, and specifies a first image having plural areas in which the object appears, the first image being photographed first, and a second image having plural areas in which the object appears, the second image being photographed latest, from among plural images of a second image group, the second image group including the plural images relating to the specific moments of motion of the object from among the first image group including the plural images, and the specifying unit specifying the first image and the second image based on a change in the acquired pixel values of the plural areas and the threshold values set by the threshold value setting unit.

7. A method of specifying images in an image processing apparatus, the method comprising:

acquiring a first image group including plural images, the plural images being obtained by sequentially photographing motion of an object;

setting plural areas at plural positions on each of the images of the first image group;

setting representative values of the pixel values of the areas of a prescribed number of images falling within a prescribed period as threshold values for specifying plural images relating to specific moments of motion of the object;

calculating one of an average value and a median value of the pixel values of the areas set on the prescribed number of images, the calculated one of the average value and the median value being set as one of the representative values; and acquiring pixel values of the plural areas set on each of the images, and specifying a first image having plural areas in which the object appears, the first image being photographed first, and a second image having plural areas in which the object appears, the second image being photographed latest, from among plural images of a second image group, the second image group including the plural images relating to the specific moments of motion of the object from among the first image group including the plural images, and the first image and the second image being specified based on a change in the acquired pixel values of the plural areas and the set threshold values.

* * * * *